(12) United States Patent
Ran et al.

(10) Patent No.: US 12,438,755 B2
(45) Date of Patent: Oct. 7, 2025

(54) SYMBOL MULTIPLEXING PHYSICAL MEDIUM ATTACHMENT (PMA)

(71) Applicant: Cisco Technology, Inc., San Jose, CA (US)

(72) Inventors: Adee Ran, Maayan Baruch (IL); Mark A. Gustlin, Campbell, CA (US); Aviran Kadosh, Moreshet (IL)

(73) Assignee: Cisco Technology, Inc.

( * ) Notice: Subject to any disclaimer, the term of this patent is extended or adjusted under 35 U.S.C. 154(b) by 316 days.

(21) Appl. No.: 18/156,841

(22) Filed: Jan. 19, 2023

(65) Prior Publication Data

US 2024/0097949 A1   Mar. 21, 2024

Related U.S. Application Data

(60) Provisional application No. 63/376,003, filed on Sep. 16, 2022.

(51) Int. Cl.
*H04L 25/14* (2006.01)
*H04L 25/02* (2006.01)

(52) U.S. Cl.
CPC .......... *H04L 25/14* (2013.01); *H04L 25/0272* (2013.01)

(58) Field of Classification Search
CPC ..................... H04L 25/14; H04L 25/0272
See application file for complete search history.

(56) References Cited

U.S. PATENT DOCUMENTS

| 8,949,699 B1* | 2/2015 | Gustlin | H03M 13/1515 714/784 |
|---|---|---|---|
| 2016/0087753 A1 | 3/2016 | Ram et al. | |
| 2017/0170927 A1 | 6/2017 | Stone et al. | |
| 2020/0145022 A1 | 5/2020 | Basso et al. | |
| 2021/0399831 A1* | 12/2021 | Lu | H04L 1/0003 |

OTHER PUBLICATIONS

Gustlin et al. "RS symbol muxing option for 802.3ck";ieee draft; pp. 1-15 (Year: 2018).*
Lusted "IEEE P802.3df electrical PMDs and AUIs overview". ieee P802.3df task force, pp. 1-21 (Year: 2022).*
Notification of Transmittal of the International Search Report and the Written Opinion of the International Searching Authority mailed Jan. 5, 2024, in International Patent Application No. PCT/US2023/074385 (16 pages).

(Continued)

*Primary Examiner* — Rahel Guarino
(74) *Attorney, Agent, or Firm* — Merchant & Gould P.C.

(57) ABSTRACT

Symbol multiplexing Physical Medium Attachment (PMA) may be provided. A plurality of first lanes may be received and then Alignment Markers (AMs) from the plurality of first lanes may be used to determine symbol boundaries and identify the plurality of first lanes. Next, groups of the plurality of first lanes may be de-skewed and checkerboard patterns in the plurality of first lanes may be undone. Then the plurality of first lanes may be symbol-wise multiplexed to a plurality of second lanes. The plurality of second lanes may then be sent.

18 Claims, 6 Drawing Sheets

(56) References Cited

OTHER PUBLICATIONS

Gustlin, Mark—Xilinx and Slavick, Jeff—Broadcom: "RS Symbol Muxing Option for 802.3ck", IEEE Draft; GUSTLIN_3CK_01_0718, IEEE-SA, Piscataway, NJ USA; vol. 802.3ck; 802.3.100GEL; Retrieved from the Internet: URL:grouper.ieee.org/groups/802/3/ck/public/18_07/gustlin_3ck_01_0718.pdf [retrieved on Jul. 2, 2018] (15 pages).

Lusted, Kent "IEEE P802.3DF Electrical PMDs and AUIs Overview" IEEEP802.3df Task Force, Jan. 2022 vol. 802.3df Jan. 14, 2022; XP068187725, Retrieved from the Internet: URL:https://grouper.ieee.org/groups/802/3/df/public/22_01/lusted_3df_01_220118.pdf [retrieved on Jan. 15, 2022] (21 pages).

\* cited by examiner

FIG. 3

| UI\Lane | 0 | 1 | 2 | 3 |
|---|---|---|---|---|
| | ⋮ | ⋮ | ⋮ | ⋮ |
| 24 | A48 A49 | A58 A59 | A68 A69 | A78 A79 |
| 23 | A46 A47 | A56 A57 | A66 A67 | A76 A77 |
| 22 | A44 A45 | A54 A55 | A64 A65 | A74 A75 |
| 21 | A42 A43 | A52 A53 | A62 A63 | A72 A73 |
| 20 | A40 A41 | A50 A51 | A60 A61 | A70 A71 |
| 19 | D8 D9 | D18 D19 | D28 D29 | D38 D39 |
| 18 | D6 D7 | D16 D17 | D26 D27 | D36 D37 |
| 17 | D4 D5 | D14 D15 | D24 D25 | D34 D35 |
| 16 | D2 D3 | D12 D13 | D22 D23 | D32 D33 |
| 15 | D0 D1 | D10 D11 | D20 D21 | D30 D31 |
| 14 | C8 C9 | C18 C19 | C28 C29 | C38 C39 |
| 13 | C6 C7 | C16 C17 | C26 C27 | C36 C37 |
| 12 | C4 C5 | C14 C15 | C24 C25 | C34 C35 |
| 11 | C2 C3 | C12 C13 | C22 C23 | C32 C33 |
| 10 | C0 C1 | C10 C11 | C20 C21 | C30 C31 |
| 9 | B8 B9 | B18 B19 | B28 B29 | B38 B39 |
| 8 | B6 B7 | B16 B17 | B26 B27 | B36 B37 |
| 7 | B4 B5 | B14 B15 | B24 B25 | B34 B35 |
| 6 | B2 B3 | B12 B13 | B22 B23 | B32 B33 |
| 5 | B0 B1 | B10 B11 | B20 B21 | B30 B31 |
| 4 | A8 A9 | A18 A19 | A28 A29 | A38 A39 |
| 3 | A6 A7 | A16 A17 | A26 A27 | A36 A37 |
| 2 | A4 A5 | A14 A15 | A24 A25 | A34 A35 |
| 1 | A2 A3 | A12 A13 | A22 A23 | A32 A33 |
| 0 | A0 A1 | A10 A11 | A20 A21 | A30 A31 |

Last (UI 24) ... First (UI 0)

FIG. 4

SYMBOL MULTIPLEXING PHYSICAL MEDIUM ATTACHMENT (PMA)

RELATED APPLICATION TECHNICAL FIELD

Under provisions of 35 U.S.C. § 119(e), Applicant claims the benefit of U.S. Provisional Application No. 63/376,003 filed Sep. 16, 2022, which is incorporated herein by reference.

TECHNICAL FIELD

The present disclosure relates generally to symbol multiplexing Physical Medium Attachment (PMA).

BACKGROUND

Ethernet is a family of wired computer networking technologies commonly used in Local Area Networks (LAN), Metropolitan Area Networks (MAN) and Wide Area Networks (WAN). It was commercially introduced in 1980 and first standardized in 1983 as Institute of Electrical and Electronic Engineers (IEEE) 802.3. Ethernet has since been refined to support higher bit rates, a greater number of nodes, and longer link distances, but retains much backward compatibility. Over time, Ethernet has largely replaced competing wired LAN technologies such as Token Ring.

The original 10BASE5 Ethernet uses coaxial cable as a shared medium, while the newer Ethernet variants use twisted pair and fiber optic links in conjunction with switches. Systems communicating over Ethernet divide a stream of data into shorter pieces called frames. Each frame contains source and destination addresses, and error-checking data so that damaged frames can be detected and discarded. Higher-layer protocols trigger retransmission of lost frames. Per the Open Systems Interconnection (OSI) model, Ethernet provides services up to and including the data link layer.

BRIEF DESCRIPTION OF THE FIGURES

The accompanying drawings, which are incorporated in and constitute a part of this disclosure, illustrate various embodiments of the present disclosure. In the drawings:

FIG. 3 illustrates a plurality of first lanes;

FIG. 4 illustrates a plurality of second lanes; and

DETAILED DESCRIPTION

Overview

Figure 1A:
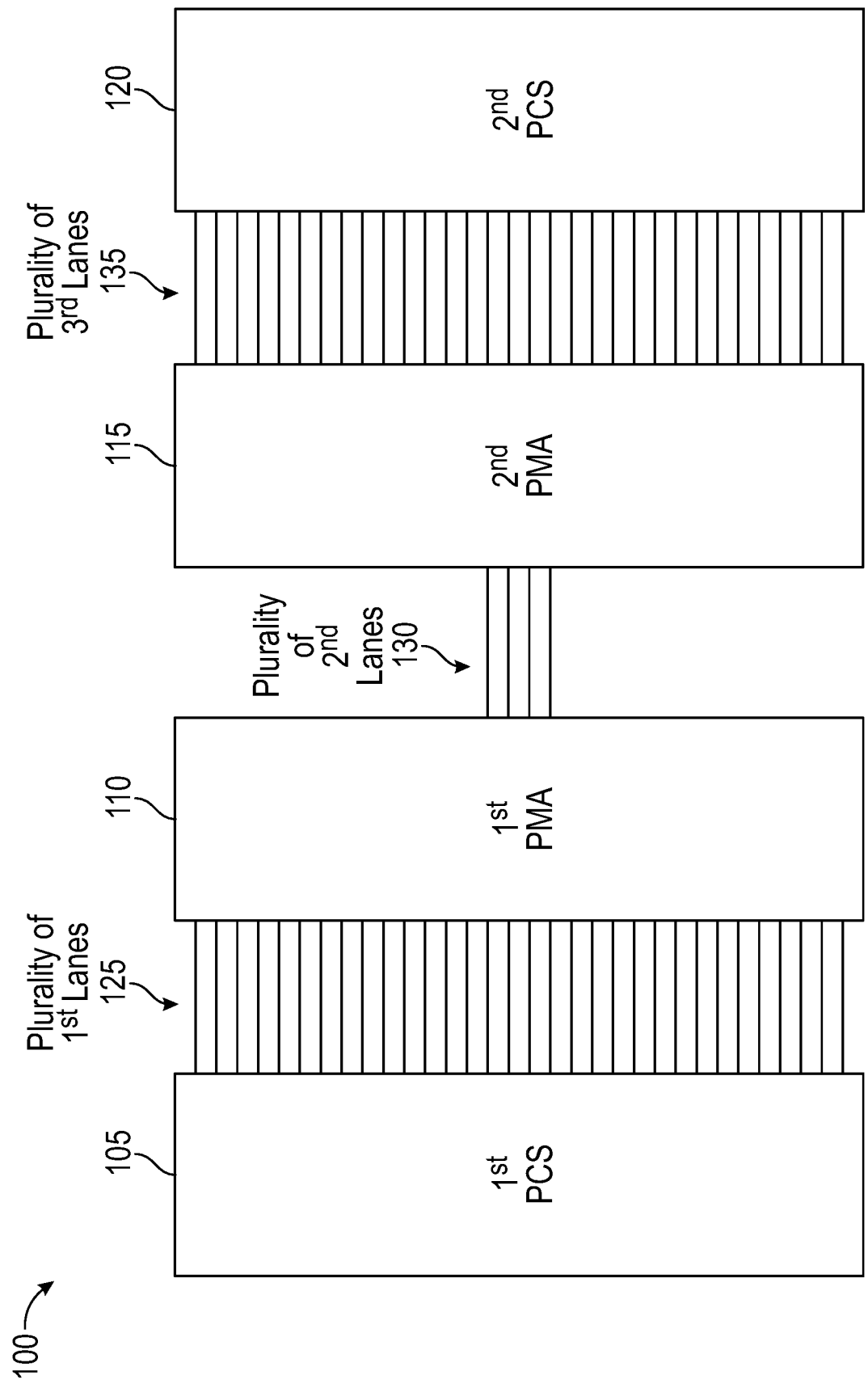
FIG. 1A is a block diagram of an operating environment for providing symbol multiplexing Physical Medium Attachment (PMA)

Symbol multiplexing Physical Medium Attachment (PMA) may be provided. A plurality of first lanes may be received and then Alignment Markers (AMs) from the plurality of first lanes may be used to determine symbol boundaries and identify the plurality of first lanes. Next, groups of the plurality of first lanes may be de-skewed and checkerboard patterns in the plurality of first lanes may be undone. Then the plurality of first lanes may be symbol-wise multiplexed to a plurality of second lanes. The plurality of second lanes may then be sent.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

High speed Ethernet Physical Layer (PHY) transceivers such as 200GBASE-R and 400GBASE-R may include a Multi-lane Physical Coding Subsystem (PCS). The PCS may distribute, for example, its data across PCS lanes at 25 Gb/s per lane (e.g., PCS 16 lanes for 400GBASE-R). The PCS may also include a Forward Error Correction (FEC) functionality that aids in error free communication.

The existing PHY specifications may also include a bit-multiplexing Multiplexing Physical Medium Attachment (PMA) that may combine data from the PCS lanes to create symbols for communicating over a smaller number of physical lanes. For example, 400G may be transmitted over only 4 physical lanes, where every physical lane contains bits from 4 PCS lanes, taken one bit at a time. In the receive direction, the bits from the physical lanes may be de-multiplexed to create the original number of PCS lanes.

The IEEE 802.3df task force may define a 800GBASE-R Ethernet that may use a similar PCS (e.g., with 32 PCS lane) and a similar bit-multiplexing PMA for communicating over 8 physical lanes (e.g., 100 Gb/s per lane). A next step may be 200 Gb/s per lane, which may require multiplexing 8 PCS lanes on each physical lane.

One problem may be that high ratio bit multiplexing may reduce the capability of the FEC handle error bursts that may occur frequently in some links. This degradation may be expressed as a Signal-to-Noise Ratio (SNR) penalty or as a reduction of the maximum tolerated pre-FEC Bit Error Rate (BER) for satisfactory operation. With 8:1 bit multiplexing, the SNR penalty, for example, may be as high as 2 dB, and the maximum tolerated BER may be reduced by a factor of 6 for example.

Using FEC symbol multiplexing instead of bit multiplexing may eliminate the degradation due to error burst and enable lower SNR requirements and higher tolerated BER. However, symbol multiplexing may be incompatible with existing implementations that use bit multiplexing (i.e., optical modules that have bit-multiplexed data on the 8×100G host-side interface).

Embodiments of the disclosure may use a PMA that may convert between bit multiplexing and symbol multiplexing. The PMA may have two bi-directional interfaces. On each interface it may perform either bit multiplexing (e.g., in both directions) or symbol multiplexing (e.g., in both directions). This PMA may be used, for example, in gearboxes or optical modules that may have 100 Gb/s per lane electrical (host side) interfaces and 200 Gb/s optical (line side) interfaces. These gearboxes and optical modules may exist at least for a transition period between the current 100 Gb/s per lane and the future 200 Gb/s per lane technologies.

The conversion from incoming bit multiplexing to outgoing symbol multiplexing may use de-multiplexing to recover the original data streams (e.g., PCS lanes) from incoming data, which may be done using alignment markers inserted by the transmitting (i.e., remote) PCS. Once the original data is available as PCS lanes, it may then be symbol multiplexed for outgoing transmission. Conversion from symbol multiplexing to bit multiplexing may be done similarly.

Consistent with embodiments of the disclosure, the PMA may identify alignment markers with bit multiplexing in one direction and with symbol multiplexing in the other direction that may enable alignment of symbols and correct de-multiplexing or re-multiplexing. The rest of the PCS functionality (e.g., de-skew, reorder, FEC encoding, and decoding, etc.) may not be required.

Embodiments of the disclosure may define the choice of bit or symbol multiplexing as a function of bit rate on each physical lane. For example, 200 Gb/s per lane may use symbol multiplexing and 100 Gb/s per lane may use bit multiplexing. This is an example, and it is possible to use symbol multiplexing at any rate. If there is a bit rate for which both multiplexing methods may be defined, it is possible to automatically identify the multiplexing of the incoming data on one interface, and ensure that the outgoing data on the same interface has the same multiplexing. This way, transparent interoperability with existing devices that only use bit multiplexing may be achieved.

FIG. 1A shows an operating environment 100 for providing symbol multiplexing Physical Medium Attachment (PMA). As shown in FIG. 1A, operating environment 100 may comprise a first Physical Coding Subsystem (PCS) 105, a first PMA 110, a second PMA 115, and a second PCS 120. First PCS 105 may provide a plurality of first lanes 125 to first PMA 110. First PMA 110 may symbol-wise multiplex plurality of first lanes 125 on plurality of second lanes 130 and send to second PMA 115. Second PMA 115 may symbol-wise de-multiplex plurality of second lanes 130 to create plurality of third lanes 135. Plurality of third lanes 135 may comprise a recreated version of plurality of first lanes 125. The plurality of first lanes may be greater than plurality of second lanes 130. Plurality of second lanes 130 may be less than plurality of third lanes 135. Data may be communicated in both directions across operating environment 100.

Plurality of first lanes 125 may comprise a plurality of PCS lanes. Plurality of first lanes 125 may comprise, but are not limited to, 32 PCS lanes. Plurality of first lanes 125 may comprise, but are not limited to, 25 Gb/s Physical Coding Subsystem (PCS) lanes.

Plurality of second lanes 130 may comprise a plurality of Attachment Unit Interface (AUI) lanes. Plurality of second lanes 130 may comprise, but are not limited to, 4 AUI lanes. Plurality of second lanes 130 comprise, but are not limited to, 200 Gb/s AUI lanes.

Figure 1B:
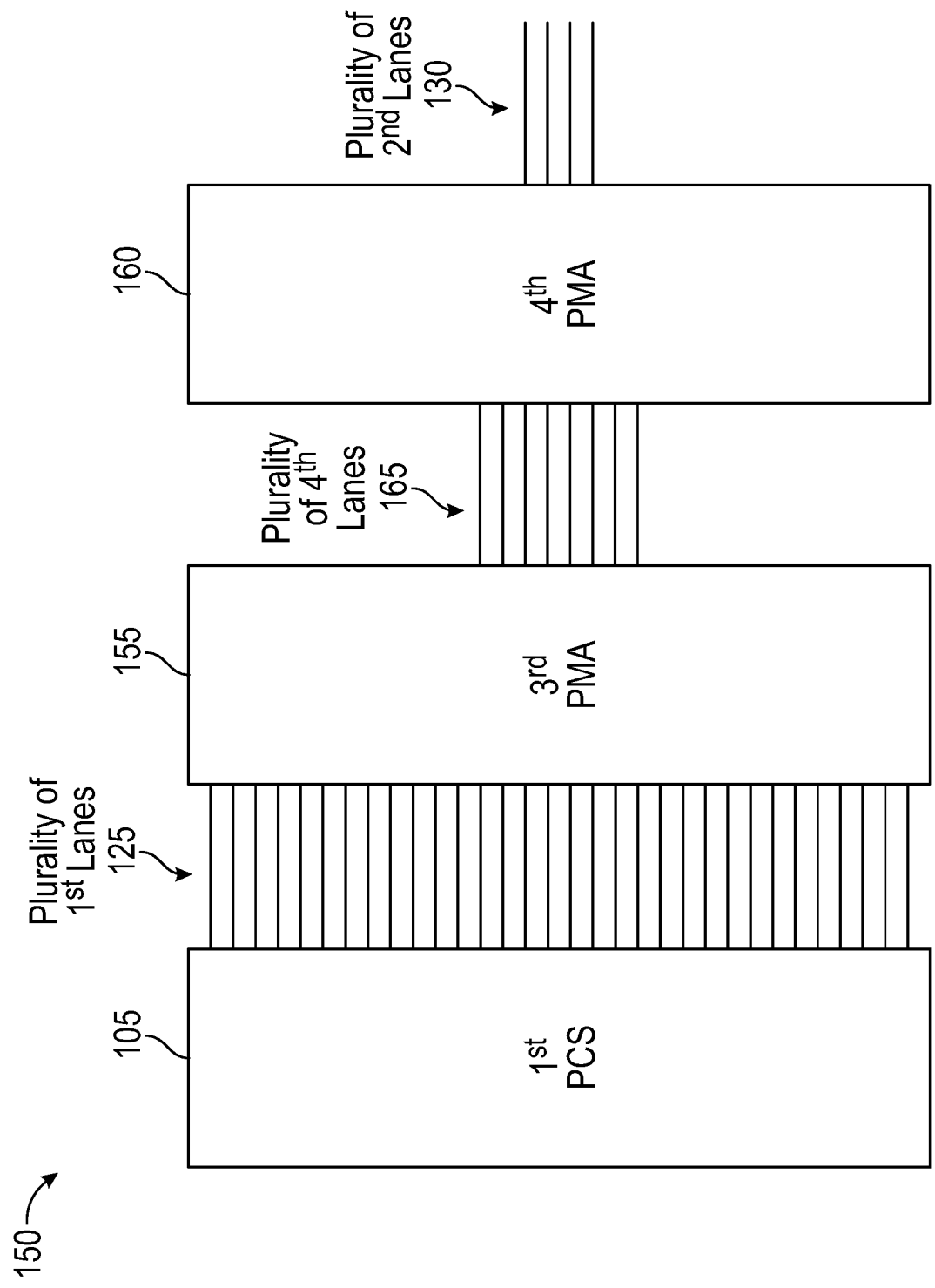
FIG. 1B is a block diagram of an operating environment for providing symbol multiplexing PMA.

FIG. 1B shows an operating environment 150 for providing symbol multiplexing Physical Medium Attachment (PMA). As shown in FIG. 1B, operating environment 100 may comprise first PCS 105, a third PMA 155, and a fourth PMA 160. First PCS 105 may provide plurality of first lanes 125 to third PMA 155. Third PMA 155 may bit-wise multiplex plurality of first lanes 125 on plurality of fourth lanes 165 and send to fourth PMA 160. Fourth PMA 160 may bit-wise de-multiplex plurality of fourth lanes 165 to recreate plurality of first lanes 125. Now with the recreate plurality of first lanes 125, fourth PMA 160 may symbol-wise multiplex plurality of first lanes 125 on plurality of second lanes 130 and send to a receiver. The receiver may comprise another PMA, for example, second PMA 115. In other embodiments, the receiver may comprise an PMA similar to fourth PMA 160 that may symbol-wise de-multiplex plurality of second lanes 130 and then bit-wise multiplex to send the received data to another PMA similar to third PMA 155.

Plurality of fourth lanes 165 may comprise a plurality of AUI lanes. Plurality of fourth lanes 165 may comprise, but are not limited to, 8 AUI lanes. Plurality of fourth lanes 165 may comprise, but are not limited to, 100 Gb/s AUI lanes.

The elements described above of operating environment 100 (e.g., first PCS 105, first PMA 110, second PMA 115, second PCS 120, third PMA 155, and fourth PMA 160) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 5, the elements of operating environment 100 may be practiced in a computing device 500.

Figure 2:
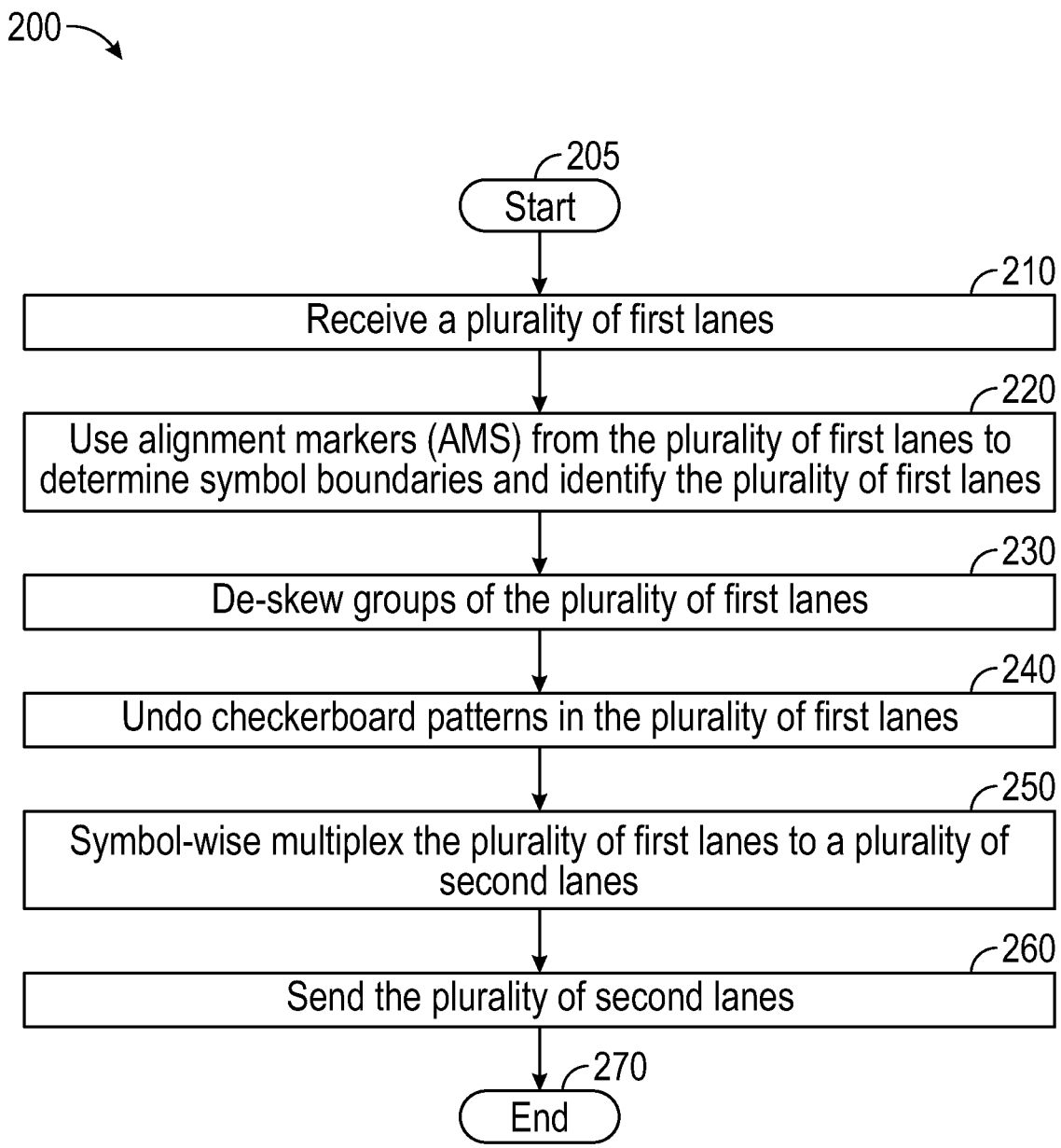
FIG. 2 is a flow chart of a method for providing symbol multiplexing PMA.

FIG. 2 is a flow chart setting forth the general stages involved in a method 200 consistent with embodiments of the disclosure for providing symbol multiplexing PMA. While method 200 may be implemented using first PMA 110 or second PMA 115 as described in more detail above with respect to FIG. 1A, method 200 is described using first PMA 110. Ways to implement the stages of method 200 will be described in greater detail below.

Figure 3:
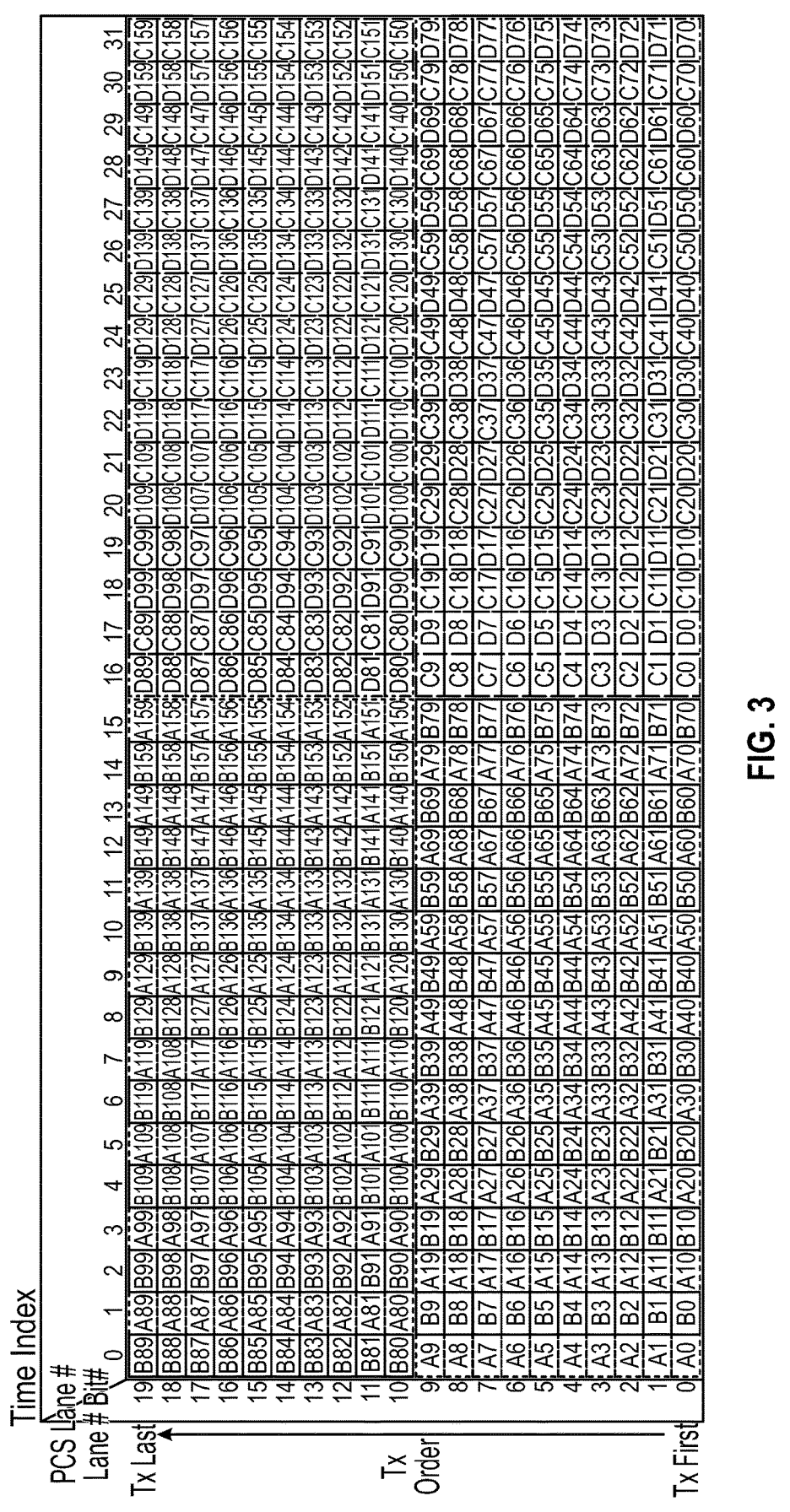

Method 200 may begin at starting block 205 and proceed to stage 210 where first PMA 110 may receive plurality of first lanes 125. For example, FIG. 3 illustrates how data bits may be a lined on plurality of first lanes 125. In this example, there are 32 lanes in plurality of first lanes 125. Horizontally along the top are lane numbers identifying the lanes and vertically along the side are bit numbers. FIG. 3 is an example and other patterners and numbers of lanes may be used.

From stage 210, where first PMA 110 receives plurality of first lanes 125, method 200 may advance to stage 220 where first PMA 110 may use Alignment Markers (AMs) from plurality of first lanes 125 to determine symbol boundaries and identify plurality of first lanes 125. For example, AMs may comprise a fixed block of data that may appear periodically on each lane that may have a lane number in it identifying its corresponding lane.

Once first PMA 110 uses AMs from plurality of first lanes 125 to determine symbol boundaries and identify plurality of first lanes 125 in stage 220, method 200 may continue to stage 230 where first PMA 110 may de-skew groups of plurality of first lanes 125. For example, there may be a different physical timing delay on each lane. Accordingly, embodiments of the disclosure may identify the symbol boundaries on each lane and then use a buffer to a line the timing of groups of lanes. A group of plurality of first lanes 125 may be symbol-wise multiplexed on to one of plurality of second lanes 130. For example, as shown in FIG. 3, lanes 0, 1, 8, 9, 16, 17, 24, and 25 of plurality of first lanes 125 may be symbol-wise multiplexed onto lane 0 of plurality of second lanes 130. Accordingly, the symbol boundaries of lanes 0, 1, 8, 9, 16, 17, 24, and 25 may be used to a line the timing of these lanes before they are symbol-wise multiplexed. Other groups of plurality of first lanes 125 may have their timing lined before they are symbol-wise multiplexed on to other lanes of plurality of second lanes 130 in a similar way. For example: i) lanes 2, 3, 10, 11, 18, 19, 26, and 27 of plurality of first lanes 125 may be de-skew before symbol-wise multiplexed onto lane 1 of plurality of second lanes 130; ii) lanes 4, 5, 12, 13, 20, 21, 28, and 29 of plurality of first lanes 125 may be de-skew before symbol-wise multiplexed onto lane 2 of plurality of second lanes 130; and iii) lanes 6, 7, 14, 15, 22, 23, 30, and 31 of plurality of first lanes 125 may be de-skew before symbol-wise multiplexed onto lane 3 of plurality of second lanes 130.

After first PMA 110 de-skews groups of plurality of first lanes 125 in stage 230, method 200 may proceed to stage 240 where first PMA 110 may undo checkerboard patterns in plurality of first lanes 125. For example, as shown in FIG. 3, lane 0 has bits from code word A in bit numbers 0 through 9, but then has bits from code word B in bit numbers 10 through 19. Lane 1 has bits from code word B in bit numbers 0 through 9, but then has bits from code word A in bit numbers 10 through 19. This creates a checkerboard pattern in lanes 0 and 1. A similar checkerboard pattern may be seen in plurality of first lanes 125 illustrated by FIG. 3. In order to undo this, for example, bits numbers 10 through 19 in lane 0 may be interchanged with bits numbers 10 through 19 in lane 1. This may be repeated in plurality of first lanes 125 illustrated by FIG. 3 to undo the checkerboard pattern.

From stage 240, where first PMA 110 undoes checkerboard patterns in plurality of first lanes 125, method 200 may advance to stage 250 where first PMA 110 may symbol-wise multiplex plurality of first lanes 125 to plurality of second lanes 130. For example, instead of transmitting one bit at a time from each PCS lane, symbol-wise multiplex may transmit one FEC symbol at a time. The bits of plurality of first lanes 125 (e.g., 32 lanes shown in FIG. 3) may be allocated to plurality of second lanes 130 as illustrated by FIG. 4 (e.g., 4 lanes). Most error bursts would affect up to 1 symbol per codeword. Spreading to other codewords is also less likely. In this example, affecting two symbols in the same codeword may requires at least a 17 Unit Interval (UI) burst. Spreading to other codewords is also less likely.

Embodiments of the disclosure may create a round-robin symbol order on each physical lane for best burst immunity. Consistent with other embodiments, in the transmit direction, after alignment to symbol-pair (e.g., 20-bit) boundary, a delay may be applied (e.g., a 1-symbol (10-bit) delay)) to every odd PCS line (e.g., plurality of first lanes 125). Accordingly, this may turn the "checkerboard" (e.g., FIG. 3) into a striped pattern (e.g., FIG. 4), and may level the ground for symbol-wise multiplexing. The added delay may be automatically handled by the receiver's PCS de-skew function. Symbol-pairs may be multiplexed (e.g., 20-bit chunks) from each PCS lane (e.g., plurality of first lanes 125) into the PMA lane (e.g., plurality of second lanes 130). For example, in 800G, alternate symbol-pairs may be alternated between flow 0 and flow 1. In 200G/400G, any order may be used for example.

Once first PMA 110 symbol-wise multiplexes plurality of first lanes 125 to plurality of second lanes 130 in stage 250, method 200 may continue to stage 260 where first PMA 110 may send plurality of second lanes 130. For example, a receiver (e.g., second PMA 115) may receive plurality of second lanes 130 and perform the aforementioned process in reverse to reproduce plurality of first lanes 125. Communication may be performed in both directions across operating environment 100 of FIG. 1A. Once first PMA 110 sends plurality of second lanes 130 in stage 260, method 200 may then end at stage 270.

If a PMA that performs bit-wise multiplexing is used (e.g., third PMA 155 of FIG. 1B), the plurality of first lanes 125 may be recreated by bit-wise de-multiplexing plurality of fourth lanes 165 by fourth PMA 160. Then fourth PMA 160 may perform the aforementioned process of method 200 on the recreated plurality of first lanes 125 in order to create plurality of second lanes 130. For example, a receiver may receive plurality of second lanes 130 and perform the process in reverse to reproduce plurality of first lanes 125. Communication may be performed in both directions across operating environment 150 of FIG. 1B.

Figure 5:
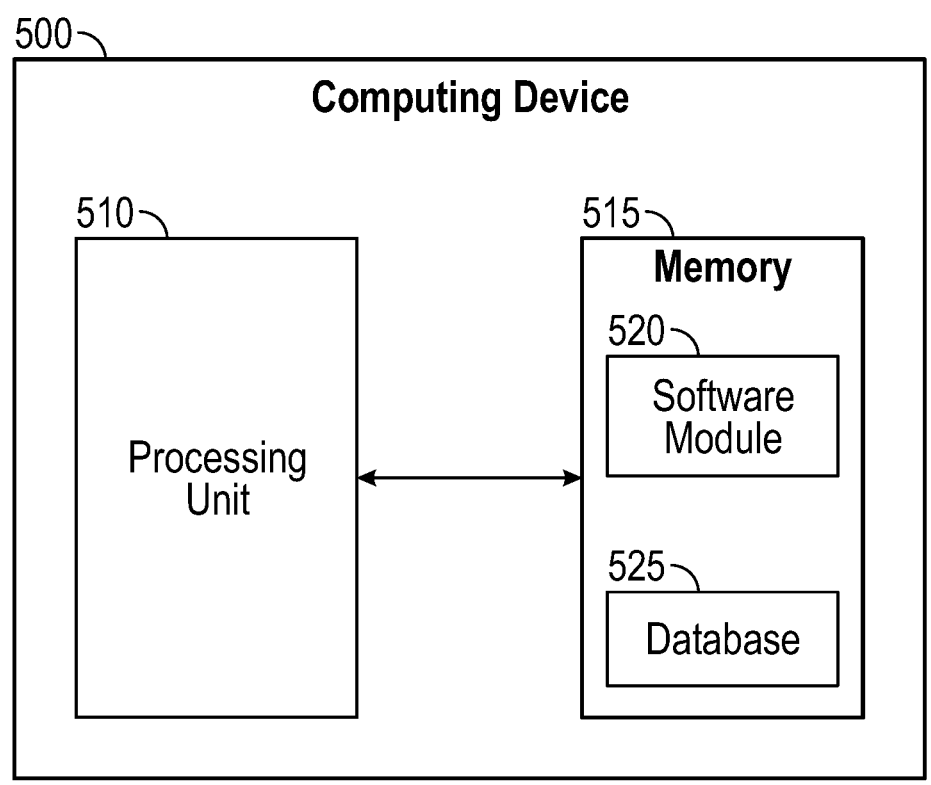
FIG. 5 is a block diagram of a computing device.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform, for example, processes for providing symbol multiplexing PMA as described above with respect to FIG. 2. Computing device 500, for example, may provide an operating environment for first PCS 105, first PMA 110, second PMA 115, second PCS 120, third PMA 155, and fourth PMA 160. First PCS 105, first PMA 110, second PMA 115, second PCS 120, third PMA 155, and fourth PMA 160 may operate in other environments and are not limited to computing device 500.

Computing device 500 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples, and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
   receiving a plurality of first lanes;
   de-skewing groups of the plurality of first lanes;
   undoing checkerboard patterns in the plurality of first lanes;
   symbol-wise multiplexing the plurality of first lanes to a plurality of second lanes; and
   sending the plurality of second lanes;
   receiving the plurality of second lanes;
   symbol-wise de-multiplexing the plurality of second lanes to a plurality of third lanes;
   applying checkerboard patterns to the plurality of third lanes; and
   sending plurality of third lanes.

2. The method of claim 1, further comprising, prior to de-skewing the groups of the plurality of first lanes, using Alignment Markers (AMs) from the plurality of first lanes to determine symbol boundaries and identify the plurality of first lanes.

3. The method of claim 1, wherein the plurality of first lanes are greater than the plurality of second lanes.

4. The method of claim 1, wherein the plurality of first lanes comprise a plurality of Physical Coding Subsystem (PCS) lanes.

5. The method of claim 1, wherein the plurality of first lanes comprise 32 Physical Coding Subsystem (PCS) lanes.

6. The method of claim 1, wherein the plurality of first lanes comprise 32, 25 Gb/s Physical Coding Subsystem (PCS) lanes.

7. The method of claim 1, wherein the plurality of second lanes comprise a plurality of Attachment Unit Interface (AUI) lanes.

8. The method of claim 1, wherein the plurality of second lanes comprise 4 Attachment Unit Interface (AUI) lanes.

9. The method of claim 1, wherein the plurality of second lanes comprise 4, 200 Gb/s Attachment Unit Interface (AUI) lanes.

10. The method of claim 1, wherein the plurality of second lanes are less than the plurality of third lanes.

11. The method of claim 1, further comprising, prior to receiving the plurality of first lanes, bit-wise de-multiplexing a plurality of fourth lanes to create the plurality of first lanes.

12. A system comprising:
   a memory storage; and
   a processing unit coupled to the memory storage, wherein the processing unit is operative to:
      receive a plurality of first lanes wherein the plurality of first lanes comprise 32 Physical Coding Subsystem (PCS) lanes;
      de-skew groups of the plurality of first lanes;

undo checkerboard patterns in the plurality of first lanes;

symbol-wise multiplex the plurality of first lanes to a plurality of second lanes; and send the plurality of second lanes.

13. The system of claim 12, wherein the processing unit is further operative to, prior to de-skewing the groups of the plurality of first lanes, use Alignment Markers (AMs) from the plurality of first lanes to determine symbol boundaries and identify the plurality of first lanes.

14. The system of claim 12, wherein the processing unit is further operative to, prior to receiving the plurality of first lanes, bit-wise de-multiplex a plurality of fourth lanes to create the plurality of first lanes.

15. The system of claim 12, wherein the plurality of first lanes comprise 25 Gb/s PCS lanes and the plurality of second lanes comprise 4, 200 Gb/s Attachment Unit Interface (AUI) lanes.

16. A non-transitory computer-readable medium that stores a set of instructions which when executed perform a method executed by the set of instructions comprising:

receiving a plurality of first lanes wherein the plurality of first lanes comprise 32 Physical Coding Subsystem (PCS) lanes;

de-skewing groups of the plurality of first lanes;

undoing checkerboard patterns in the plurality of first lanes;

symbol-wise multiplexing the plurality of first lanes to a plurality of second lanes; and sending the plurality of second lanes.

17. The non-transitory computer-readable medium of claim 16, further comprising, prior to de-skewing the groups of the plurality of first lanes, using Alignment Markers (AMs) from the plurality of first lanes to determine symbol boundaries and identify the plurality of first lanes.

18. The non-transitory computer-readable medium of claim 16, wherein the plurality of first lanes comprise 25 Gb/s PCS lanes and the plurality of second lanes comprise 4, 200 Gb/s Attachment Unit Interface (AUI) lanes.

* * * * *